United States Patent [19]

Seragnoli

[11] 4,085,759
[45] Apr. 25, 1978

[54] AUTOMATIC APPARATUS FOR TRANSFERRING CIGARETTE CONTAINERS FROM DEVICES ARRANGED TO FILL SUCH CONTAINERS TO HOPPER LOADING MECHANISMS IN PACKAGING MACHINES FOR FORMING PACKETS OF CIGARETTES

[75] Inventor: Enzo Seragnoli, Bologna, Italy

[73] Assignee: G. D. Societa Per Azioni, Italy

[21] Appl. No.: 637,665

[22] Filed: Dec. 4, 1975

[30] Foreign Application Priority Data

Dec. 11, 1974 Italy .................................. 3560 A/74

[51] Int. Cl.² .............................................. A24C 5/35
[52] U.S. Cl. ....................................... 131/25; 53/148; 198/347
[58] Field of Search .................... 131/20 R, 21 R, 25, 131/94; 53/26, 32, 35, 42, 52, 53, 54, 55, 59 R, 147, 148, 151, 203; 198/20 R, 20 C, 44, 53 R

[56] References Cited

U.S. PATENT DOCUMENTS

| 1,168,795 | 1/1916 | Ewers | 131/25 X |
|---|---|---|---|
| 1,403,098 | 1/1922 | Orstrom | 53/151 X |
| 1,764,663 | 6/1930 | Voigt | 53/59 R |
| 3,365,857 | 1/1968 | Lieptke | 53/148 |
| 3,917,049 | 11/1975 | Shirai et al. | 131/25 X |
| 3,948,276 | 4/1976 | Prandinl | 131/25 |
| 3,976,085 | 8/1976 | Hall | 131/25 |

Primary Examiner—Robert W. Michell
Assistant Examiner—V. Millin
Attorney, Agent, or Firm—Robert E. Burns; Emmanuel J. Lobato; Bruce L. Adams

[57] ABSTRACT

A system for connecting $n$ cigarette manufacturing machines by a cigarette container feeding apparatus to the loading mechanism of the grouping hopper of a packeting machine. Each manufacturing machine has means for filling single successive containers. Empty containers are rythmically supplied and removed, and full ones removed and supplied, by stepwise moving conveyor devices, with the aid of storage conveyor devices to compensate for output unbalances between the several machines. The speed of the packeting machine is substantially equal to the sum of the operating speed in the time unit of the $n$ manufacturing machines and the speed of each of said $n$ machines is equal to $v/n$. The system comprises, for each manufacturing machine, a transfer device group having a pair of transfer devices, for respectively transferring full and empty containers; a storage conveyor device for bidirectional intermittent movement; and a memory device connected to each manufacturing machine and to the packeting machine and arranged to control actuating means of each transfer device, once every $n$ steps of the conveyors, to compensate for operating unbalances of the machines.

9 Claims, 8 Drawing Figures

AUTOMATIC APPARATUS FOR TRANSFERRING CIGARETTE CONTAINERS FROM DEVICES ARRANGED TO FILL SUCH CONTAINERS TO HOPPER LOADING MECHANISMS IN PACKAGING MACHINES FOR FORMING PACKETS OF CIGARETTES

BACKGROUND OF THE INVENTION

The present invention relates to an automatic apparatus for transferring cigarette containers from devices arranged to fill such containers to hopper loading mechanisms in packaging machines for forming packets of cigarettes in cigarette manufacturing plants.

As known, the plants used at present for manufacturing cigarettes comprise two main types of machine, i.e.

(I) Cigarette producing machines which start production from cut up and cured tobacco leaves, usually called cigarette manufacturing machines, and (II) Cigarette packaging machines.

The machines of the latter type, i.e. the so-called packaging machines, usually comprise:

(1) Machines for producing packets of cigarettes usually called packeting machines;

(2) Machines for producing packs of cigarette packets usually called packing or pack-forming machines, and (3) Wrapping machines for wrapping either single packets of cigarettes, also called cellophaning machines, or single packs of cigarette packets, usually called over-wrapping machines, the cellophaning machines being arranged between the packeting machines and the packing machines, and the over-wrapping machines being placed downstream of or after the packing machines.

It is also known that various kinds of cigarette manufacturing machines referred to at I) above are adopted in practice and operate at a respective output speed of 2000 to 4000 cigarettes per minute.

For the packaging machines mentioned at II) above, there are types of packeting machines (paragraph II-1) which operate at output speeds of 100 or 200 and up to 400 packets of cigarettes per minute, whereas the production rate of various types of packing or pack-forming machine (paragraph II-2) is a function of the number of packets in each single pack. Among the wrapping machines (see paragraph (11-3) II-3) wrapping single packets of cigarettes, the applicant's assignees' cellophaning machine which can wrap 400 packets of cigarettes per minute is widely used, whereas single packs are usually wrapped by means of over-wrapping machines which operate at the same output speed as that of the packing or pack-forming machines co-operating therewith.

From the output speeds of the various types of machine in use at present, it appears that, depending on the types of machine used in forming the system or plant, a packeting machine can absorb the production or output of one to three manufacturing machines, whereas a cellophaning machine can deal with the output of one to three packeting machines.

As known, cigarettes are transferred from the manufacturing machine-(s) to the packeting machine substantially in two different ways, i.e.

(a) either by unloading the cigarettes into containers at the outlet of the cigarette manufacturing machine(s), the containers being then transferred and unloaded into assembling or grouping hopper arranged to feed the packeting line of the packeting machine, (b) or by directly connecting such outlet of the cigarette manufacturing machine(s) to the grouping hopper arranged to feed the packeting line of the packeting machine, by conveyors feeding streams of individual cigarettes, as in the applicant's applications Ser. Nos. 651,332; 651,334; 651,335; and 651,345.

The present invention concerns that branch of the art which relates to the feeding system for the packeting machine handling cigarettes produced by the manufacturing machine or machines referred to at paragraph a) above, and relates in particular to a feeding system for supplying cigarettes grouped in containers to the hoppers of the packaging machines for forming packets of cigarettes. More particularly it relates to an apparatus for transferring said containers from the means arranged to fill them to mechanisms arranged to load the hopper of the packaging machine, in a fully automatic way.

As known, the conventional cigarette containers, formed of parallelepipedic upwardly open boxes which are also open on one side and are filled by mechanical and/or pneumatic devices co-operating with the cigarette manufacturing machine, are transferred to the loading means of said hopper either manually or by means of automatically or semiautomatically operating apparatuses.

By the progress of the art, packeting machines for forming packets of cigarettes of the type described for example in U.S. Pat. No. 3,628,309 of the same applicant's assignees, were devised to operate at an output speed such as to absorb the output of one to three cigarette manufacturing machines.

Accordingly, the operating continuity and thus the efficiency of a packaging machine of the above-mentioned type depends on the continuity of operation of no less than three manufacturing machines and is thus negatively affected by the inevitable stops due to both accidents and normal maintenance of such machines. In view of the need for a high efficiency and of the possibility that such inconvenience occur, the applicant's assignees have devised, as described in their Pat. No. 3,679,079, an apparatus for feeding containers to a packaging machine of the type operating at a very high speed.

Such apparatus which is manually supplied with containers from the manufacturing machines, comprises a transfer means acting as a store or magazine for containers, to be used only while one or more of the manufacturing machines are stationary.

In this way, the operating continuity of the packaging machine is ensured even in the unfortunate case of the simultaneous stop of all the manufacturing machines, and thus the packaging machine is able to automatically operate at its maximum efficiency until said store is fully exhausted. Once they have been emptied, the containers are sent back to a single transfer means from which they are manually removed and distributed to the various manufacturing machines.

In conclusion, the feeding apparatus disclosed in the above-mentioned patent 3,679,079 receives the full containers from the manufacturing machines, and unloads the empty containers which are supplied back to said manufacturing machines by manual operations.

SUMMARY OF THE INVENTION

An object of the present invention is to provide a feeding apparatus generally of the above-mentioned type, but which operates in a fully automatic way, i.e. it is arranged to connect a plurality of cigarette manufacturing machines to a packaging machine for producing packets of cigarettes without requiring any manual intervention.

Another object of the present invention is to provide an apparatus arranged to switch or distribute the same number of containers after the same have been emptied to the various manufacturing machines.

These and still further objects are all attained by the apparatus according to the invention, which serves for connecting $n$ cigarette manufacturing machines by a feeding apparatus arranged to feed containers of cigarettes to a loading mechanism of the grouping hopper of a packeting machine. Each $n$ manufacturing machine has a filling device arranged to fill single successive containers and having rhythmically operating arrival and removal stations for the empty and full containers, respectively. The feeding apparatus comprises a plurality of step by step moving feeding conveyors for conveying the empty and full containers between the arrival and removal stations and the grouping hopper and for thereby for compensating for frequently occurring output unbalances between the machines. The loading mechanism of the grouping hopper comprises a mobile member arranged to receive a container full of cigarettes and to unload it into the grouping hopper and being controlled by an electrosensitive device arranged to detect the end of the emptying operation of said container of cigarettes and to control the cyclic repetition of the unloading operation of successive containers. The output speed $v$ of the packeting machine is substantially equal to the sum of the output speed in the time unit of the $n$ manufacturing machines. The output speed of each of the latter machines is equal to $v/n$.

According to the invention the feeding apparatus it comprises, for each of said $n$ manufacturing machines, having a pair of conveying devices which connect the respective arrival and removal stations to the step by step moving conveying devices for conveying the empty and full containers; a bidirectionally intermittently moving storage conveyor or store conveying device; and transfer devices. The new feeding apparatus is arranged to control driving means for each transfer device once each step of the conveyors, so as to transfer empty and full containers, as needed, between the machines and the conveyors, depending on whether the machines and the packeting machine are stationary or running.

BRIEF DESCRIPTION OF THE DRAWINGS

Further characteristics and advantages will better appear from the following detailed description of a preferred embodiment of the feeding apparatus according to the invention, illustrated by way of mere non-limiting example in the accompanying drawings in which.

DESCRIPTION OF THE PREFERRED EMBODIMENT

Figure 1:
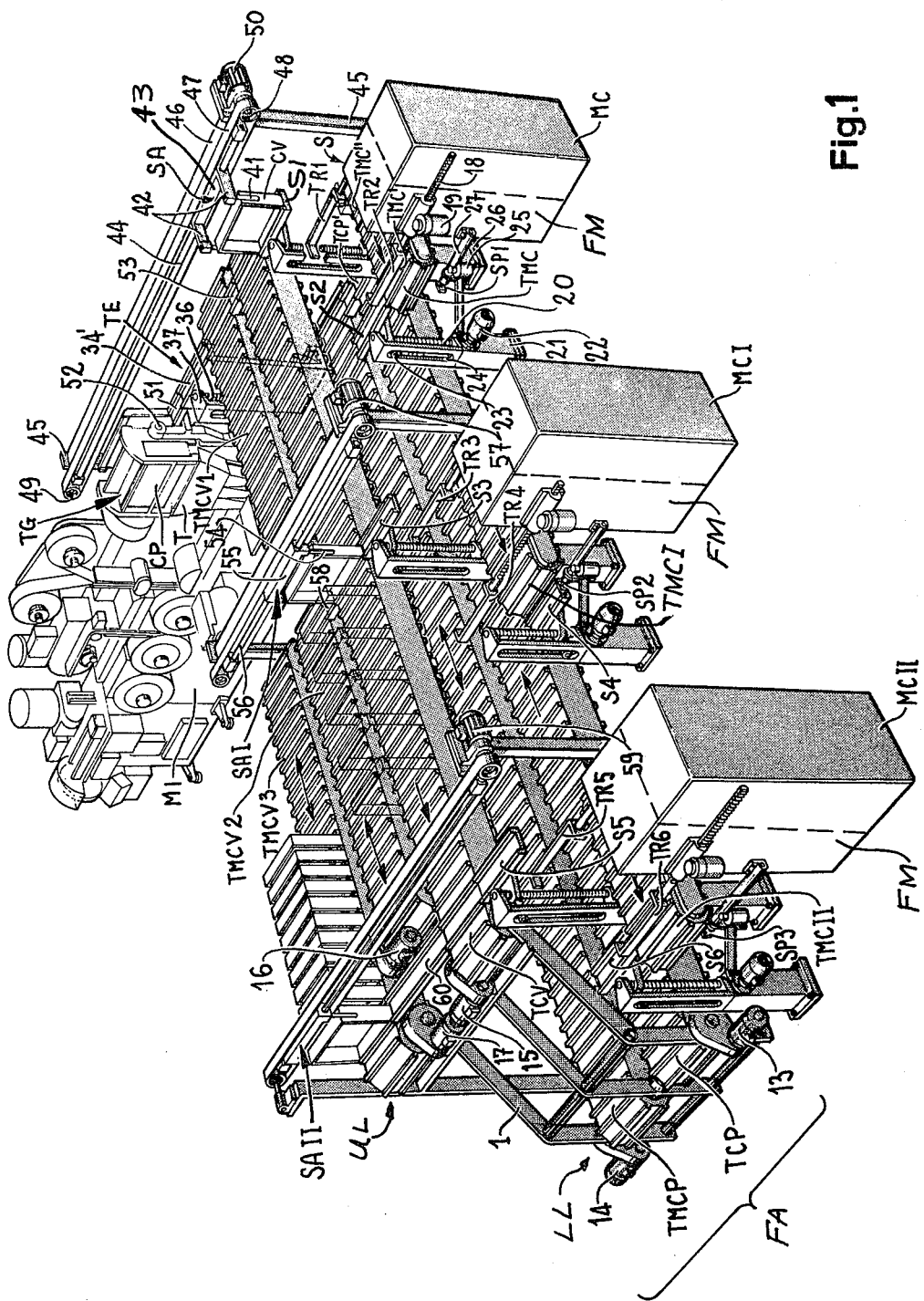
FIG. 1 is a perspective view of an apparatus according to the invention using three cigarette manufacturing machines and a packaging machine for producing packets of cigarettes.

With particular reference to FIG. 1, MI indicates a cigarette packaging machine for producing packets of cigarettes at high speed, as disclosed in the above-mentioned U.S. Pat. No. 3,628,309 known on the market under the denomination G.D.X1, which is capable of absorbing the output of three conventional manufacturing machines With said machine MI co-operates a multiple-channel hopper T arranged to form groups or batches of cigarettes and a rotary loading head TG located above the hopper and of the type for example as disclosed in U.S. Pat. No. 3,486,647. Containers CP full of cigarettes are introduced into said head and empty containers CV are removed therefrom.

MC, MCI and MCII indicate three cigarette manufacturing machines equipped, as known, with filling means for filling the empty containers CV, these machines being diagrammatically illustrated by parallelepipedic blocks arranged at uniform distance from each other along a line normal to the length direction of the machine MI. On the side facing the machine MI each of said manufacturing machines has a horizontal conveyor, shown as a conveyor TMC associated with the machine MC, a conveyor TMCI with the machine MCI, and a conveyor TMCII with the machine MCII.

Said conveyors are successively arranged along lines parallel to that along which the three manufacturing machines are arranged, are given an intermittent motion in the direction of the respective arrows, by the respective machines, and have seats arranged to be occupied by empty containers upstream of the filling devices and by full containers downstream of such devices.

A feeding apparatus FA is located between said manufacturing machines MC, MCI, MCII and said packaging machine MI and longitudinally extends parallel to the line of disposition of the manufacturing machines and thus extends normally to the length of the machine MI.

Such feeding apparatus, similarly to what is disclosed in the above-mentioned U.S. Pat. No. 3,679,079, comprises a plurality of horizontal belt or chain conveyors, including TCP, TMCP and TCV, which extend longitudinally of the line of manufacturing machines. These conveyors are arranged at two different levels, are supported by a common frame 1, and have transversal seats for locating full containers CP or empty containers CV. Each of said conveyors, as well as the conveyors TMC, TMCI, TMCII, can comprise for example (see FIG. 2) two parallel chains 2 endlessly wound around sprocket wheels 3 keyed on shafts 4 transversal extending to the feeding apparatus and carried by the frame 1.

The two chains of each conveyor are also connected to one another by means of listels or slots 5 which are shaped and dimensioned in such a way as to define the transversal seats in succession, arranged to locate the containers.

Said conveyors are intermittently or stepwise driven. The driving device for each of them (always according to the example of FIG. 2) comprises a reduction unit 6 which rotates, through a gear 7, a gear wheel 8 idly mounted on a shaft 9.

A pin 10 and an arcuate sector 11 located in a position diametrically opposed to the pin 10 are rigid with one of the faces of the gear wheel 8 and as known are arranged to intermittently drive a maltese cross 12 which is keyed on one of the shafts 4 of each conveyor, and thus each conveyor is intermittently or stepwise actuated.

Figure 8:
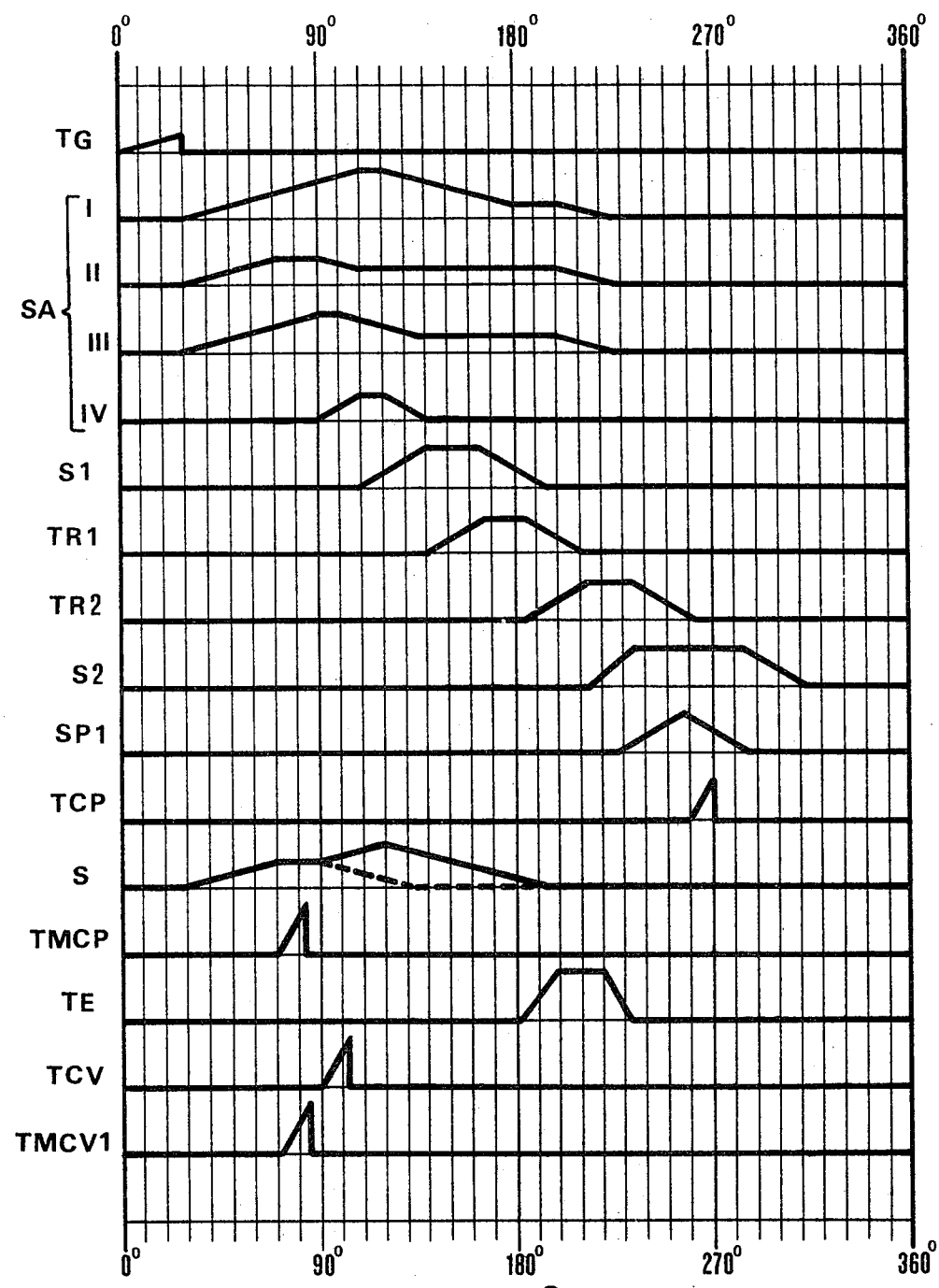
FIG. 8 is a time-phase diagram of the moving parts in an operating cycle of the feeding apparatus according to the invention.

If one or more of said conveyors shall slide in two directions, motors rotating in both directions will be used together with devices of the type illustrated in FIGS. 8 and 9 of the above-mentioned U.S. Pat. No. 3,679,079.

At a bottom plane or lower level LL of said feeding apparatus FA and as parts thereof, the conveyors TCP and TMCP (see FIG. 1) are arranged side by side, below the conveyors TMC, TMCI, TMCII of the manufacturing machines and at distances therefrom transverse of the conveyors.

The conveyor TCP which is closest to the three manufacturing machines is arranged to convey the full containers from said machines, and unidirectionally moves forward in the direction of the arrow.

The second conveyor TMCP acts as a magazine or, storage unit for the full containers CP and can intermittently move forward or backward as indicated by the arrows.

Figure 2:
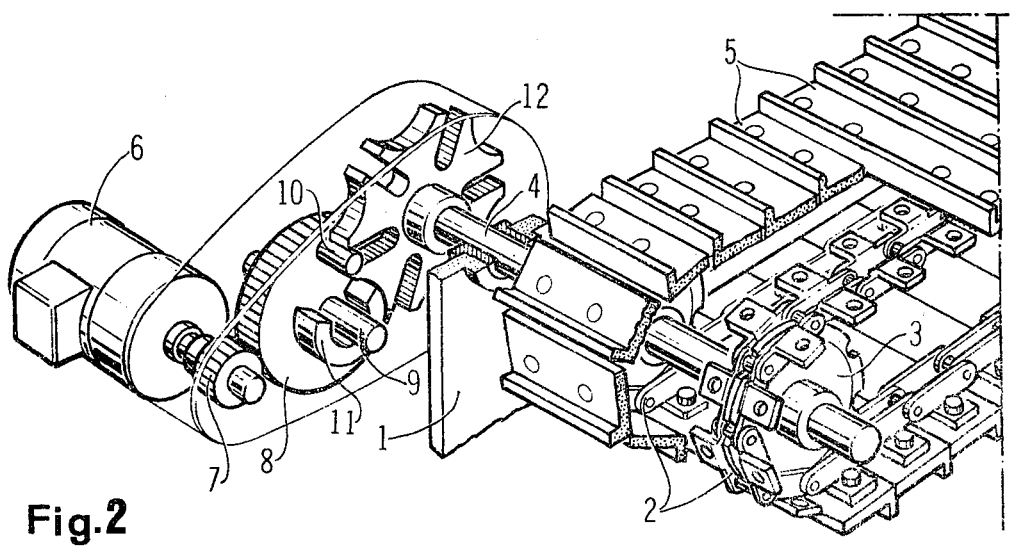
FIGS. 2 and 3 are perspective views on a larger scale than FIG. 1 of constructional details and of driving means shown respectively at the front and rear of that figure.

Said conveyors TCP and TMCP are driven by respective motors 13 and 14 through devices 7 to 12 of the type described with reference to FIG. 2.

At the upper level UL, above the conveyors TMC, TMCI, TMCII and so that the containers can be conveniently inserted into and removed from the rotary head TG, a second series of conveyors all arranged to transfer, feed and/or store empty containers CV are provided as a further part of the feeding apparatus F.A.

One of them is the conveyor TCV, arranged to convey empty containers CV to be supplied to the manufacturing machines MCI and MCII is located in alignement with and above the conveyor TCP. A motor 15 intermittently drives the conveyor TCV in the direction of the arrow, i.e. in a direction opposite to that of TCP.

Two further conveyors, that is TMCV1 acting as a storage unit for the empty containers CV to be supplied to the machine MC, and TMCV2 acting as a storage unit for empty containers to be supplied to the machine MCI, follow in alignement above the conveyor TMCP from upstream to downstream in the direction of movement of the belt TCV.

Finally, a conveyor TMCV3 acting as a storage unit for empty containers to be supplied to the machine MCII, is arranged coplanar and side by side with the conveyor TMCV2, as a still further part of feeding apparatus F.A.

Three storage conveyors, as indicated by respective arrows, can intermittently run in the two directions, i.e. a storing direction and a supplying direction with respect to the corresponding manufacturing machine.

While the conveyor TMCV1 is driven by a motor not visible in FIG. 1, the conveyors TMCV2 and TMCV3 are respectively actuated by the motors 16 and 17.

After the description foregoing of the various chain conveyors taking part in the new plant and apparatus concerned, we shall now describe the several transfer systems cooperating therewith as shown, including a feeding transfer system for the unidirectional feeding conveyors, which in turn includes a primary container transferring device group arranged to transfer the full containers CP from the manufacturing machines through the conveyors at the lower level LL to the rotary head TG of the packaging machine MI, and then those arranged to transfer the empty containers CV from said head TG through the conveyors at the upper level UL to the three manufacturing machines; the feeding transfer system also includes a secondary device group to be described later.

Figure 4:
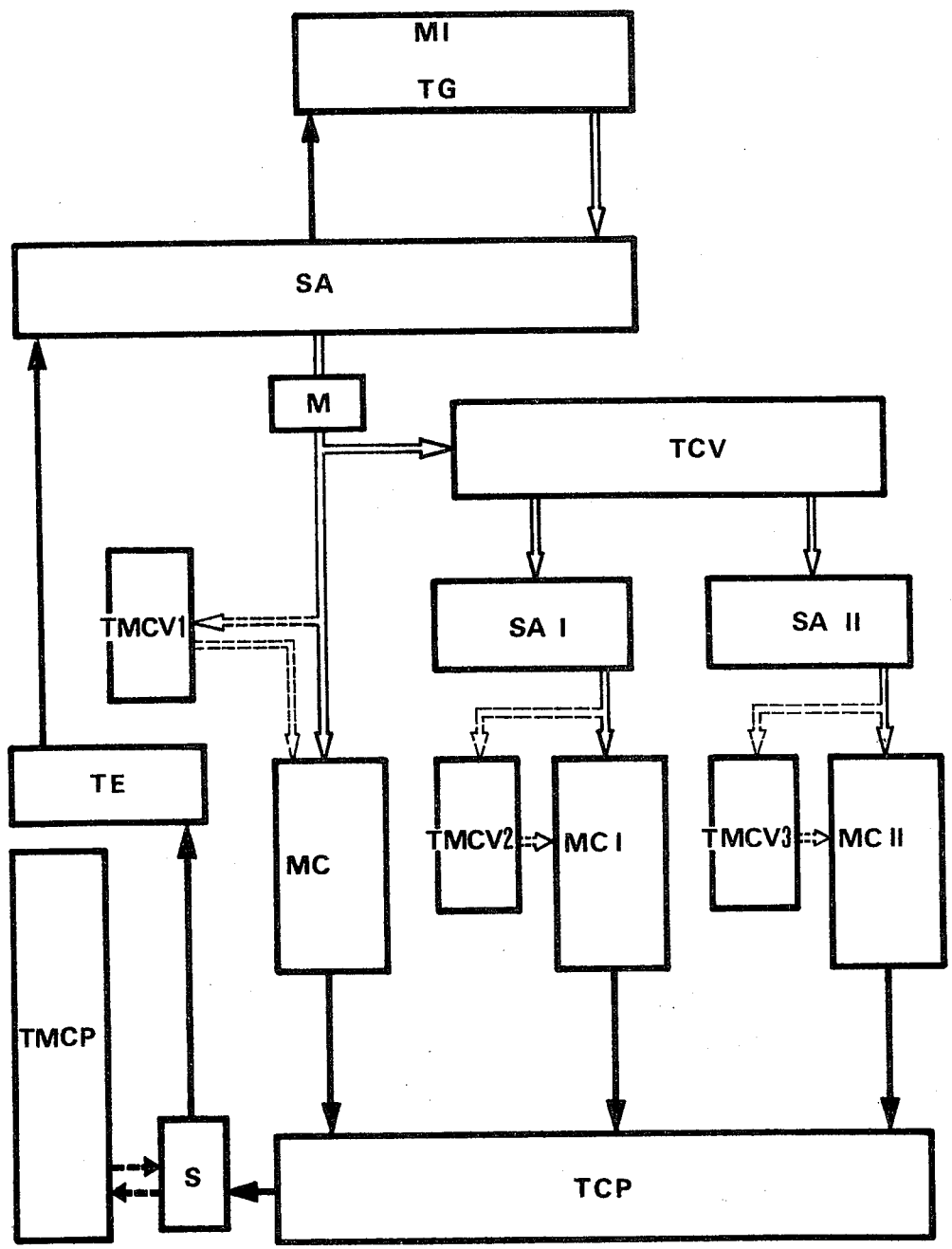
FIG. 4 is a block diagram of the plant of FIG. 1.
Figure 5:
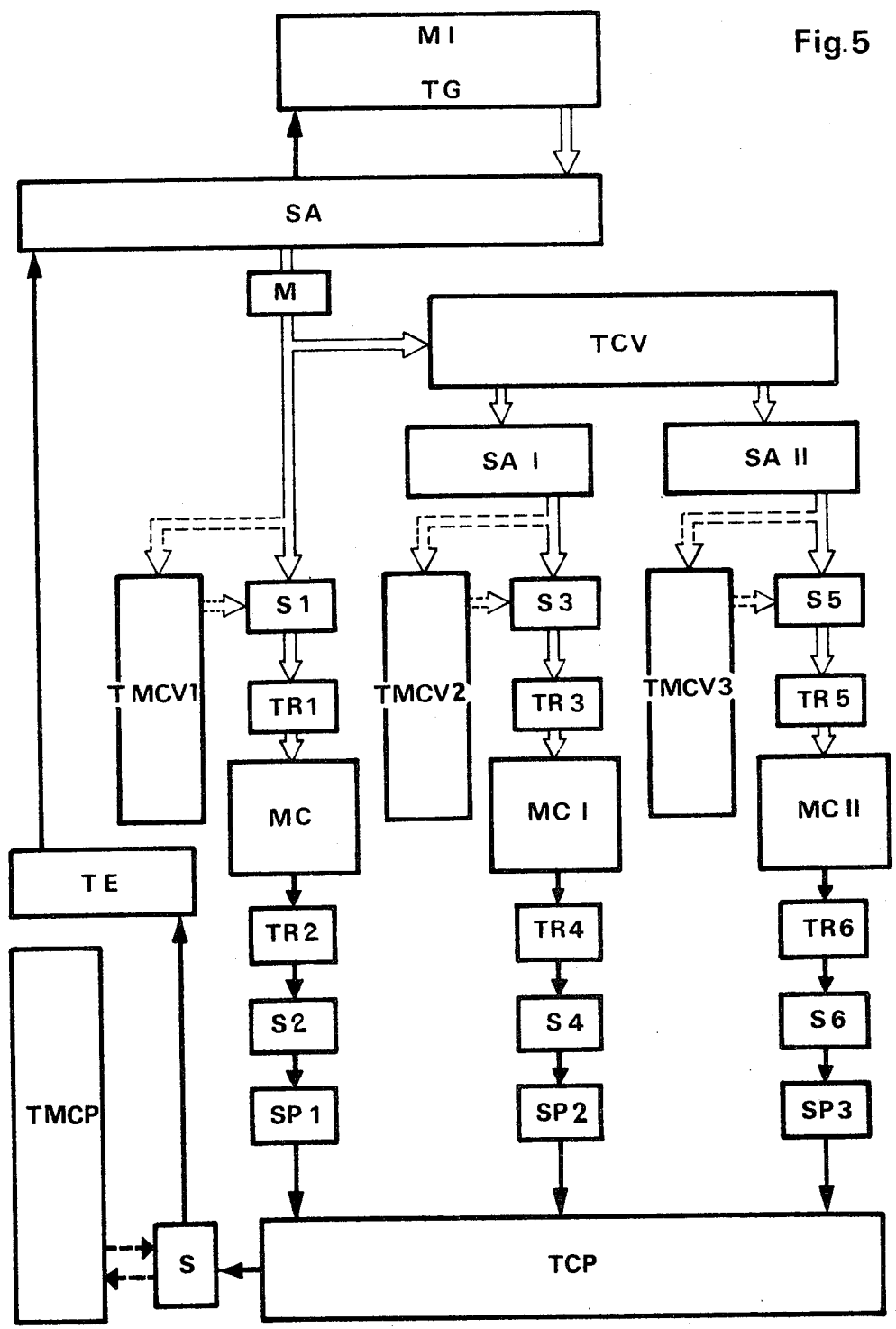
FIG. 5 is also a block diagram, showing said plant in more detail than in FIG. 4.

For a better understanding of the paths followed by the full and empty containers under the action of said means, reference should be made to FIG. 1 and to the diagrams of FIGS. 4 and 5.

In said diagrams, the connections between the various blocks are shown by dashed lines to indicate a path for full containers CP, and double thin lines to indicate the paths for empty containers CV. The directions of movement are indicated by arrows.

The blocks indicating the already mentioned store conveyors are also connected by means of dashed lines to the normal paths followed by the containers in order to show that their intervention occurs only in particular conditions as will be described below. The block M of FIGS. 4 and 5 indicates a memory device of known type the functions of which will be described below particularly in connection with the description of the electrical circuit.

With reference now to the cigarette manufacturing machine MC, after the containers have been filled up by the devices co-operating with said machine and not shown in FIG. 1, each full container CP is forwarded by means of the conveyor TMC to a station TMC' at which a first horizontal pushing or transfer means TR2 alternatingly moves backward and forward in a transfer movement transversal to said conveyor TMC (FIG. 1).

Such transfer or pushing means TR2 is so shaped as to adhere during the transfer movement to the face of the previous container with respect to the direction of movement and to the two sides thereof, and is rigid with a toothed rod 18 transversal of to the conveyor TMC, carried by the base of the machine MC and axially moved backward and forward during a stop of the conveyor TMC by a motor 19 through known means not shown in FIG. 1.

The full container CP while being moved forward is transferred from the station TMC' to a position where it is completely superimposed on a second transfer or elevator means S2 which alternatively moves in vertical direction and is now stationary in its uppermost position at the level of the conveyor TMC.

Said movement is obtained through a vertical threaded rod 20 carried at its two ends by the support 21, passing through a threaded bore formed in said elevator S2 and rotated about its axis, in a way not visible in FIG. 1, by the motor 22 fixed to the support 21.

Owing to such connection and depending on the direction of rotation of such rod 20, the elevator S2 will be raised or lowered. An idle roller 23 having horizontal axis and being arranged to slide in the vertical slot 24 formed in the support 21 is rigidly connected to the elevator S2.

A full container CP is thus transferred from the level of the conveyor TMC down to that of the conveyor TCP. When both S2 and the conveyor TCP are stationary, a full or filled container CP is transferred to one of the seats 5 on the latter conveyor TCP.

Such transfer is performed by a second horizontal pusher SP1 arranged to axially move backward and forward so as to engage during its forward movement the right-hand side, when viewing FIG. 1, of the container CP.

Said pusher SP1 is driven, through means not visible in FIG. 1, by the motor 25 fixed to the support 26 and can slide through the sleeve 27 which is carried at its ends by the support 26 and the base of the machine MC.

What has been said above about the transfer operations of the full containers CP from the manufacturing machine MC to the conveyor TCP which comprises, as described above, a first pusher TR2, an elevator S2 and a second pusher SP1 associated with said machine, can be exactly repeated for the transfer operations and means concerning the containers CP from the two remaining manufacturing machines MCI and MCII.

Also the containers CP are arranged to occupy seats on the conveyor TCP and their transfer is performed in a perfectly similar way to that described above by means of a series of means including a first horizontal pusher TR4, an elevator S4 and a second horizontal pusher SP2 as far as the containers from the machine MCI are concerned, and a first pusher TR6, an elevator S6 and a second pusher SP3 as far as containers from the machine MCII are concerned.

The three pushers SP1, SP2, SP3, in normal operating conditions of the machines MC, MCI, MCII, carry out the respective transfer operations in a well determined order, once each three forward steps of the conveyor TCP, thereby contributing to the same extent in the formation of a uniform row of full containers CP.

Each successive full container CP, occupying a seat 5 on the conveyor TCP which intermittently moves forward in the direction of the arrow, is transferred by this conveyor to a station TCPI defined at the rear end of said conveyor TCP where a secondary container transferring device group operates in conjunction with the packeting machine MI. In the latter group, a pusher S is reciprocable across the conveyor TCP, as shown in the rear view of FIG. 3.

Said pusher S comprises a horizontal arm which contacts the side of each container CP facing the manufacturing machine MC of the pusher S' is carried and driven by a screw threaded rod 28 which is screwed in a threaded bore of said arm.

Figure 3:
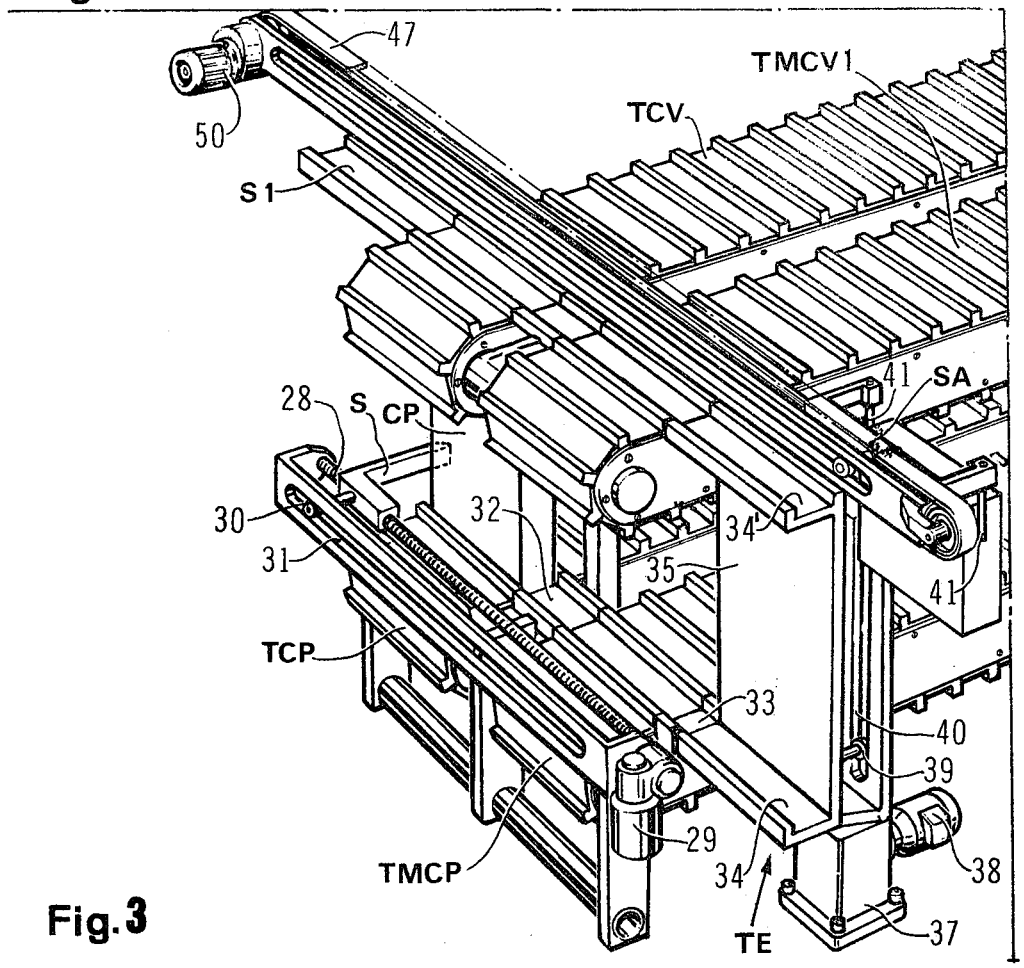

Such rod extends transversally to the conveyors located at the lower level, is carried at the ends thereof by means rigid with the frame 1, and is rotated through means not visible in FIG. 3 by the motor 29.

Owing to such mechanical connection as described above, the pusher S is moved backward or forward depending on the direction of rotation of the threaded rod 28. An idly mounted roller 30 having its axis normal to the rod 28 and arranged to slide along a slot 31, transversally extending with respect to the conveyors TCP and TMCP and formed in frame 1, is rigidly connected to the pusher S and has the usual guiding and stabilizing functions.

Thus, the full container CP laterally engaged by the pusher S can be transversally slid from conveyor TCP, while this conveyor is stationary, over a fixed bridge 32 acting as a continuity element between the two conveyors at the lower level, to one of the seats on the conveyor TMCP which is also stationary.

At this point, as is also described in the above-mentioned U.S. Pat. No. 3,679,079 two possibilities exist for the container CP, one of which involves the use of an additional conveyor transfer system, to be described now.

Should the packaging machine not require further containers, the container CP is stored by the conveyor TMCP which moves then forward from the right to the left (referring to FIG. 1), i.e. in the direction opposite to that of the conveyor TCP thereby removing the container CP from contacting the pusher S. in such conditions, the latter starts its return stroke or it may also idly complete its forward stroke.

On the contrary, i.e. in the case of normal operation of the packaging machine M1, the container CP after passing the conveyor TMCP continues being pushed by the pusher S over a fixed bridge 33 onto a seat 34 on a transferring or elevator means generally indicated by TE and arranged to vertically move up and down and to stop at its lower position.

Said elevator TE comprises a rectangular vertical plate 35 extending transversally to the various conveyors at the two levels and having said seat 34 at the lower part thereof and a second seat 34' equal and parallel to the seat 34 and located at a level higher than that of the conveyors of the empty containers CV.

The driving means for the elevator TE are only partially visible in FIGS. 1 and 3, are similar to those already described above, are coupled to the vertical threaded rod 36 carried at its ends by a support 37 and rotated in either direction of rotation about its axis through means of a known type by motor 38 rigid with said support 37.

An idle roller 39 having a horizontal axis rigid with the plate 35 is arranged to slide in a vertical slot 40 formed in the support 37 and has the usual guiding and stabilizing functions during the movement of the elevator TE.

The seat 34 is then lifted up to the level of the upper level conveyors, thereby carrying the full container CP to a position where it is inserted between two vertical bars 41 spaced from one another so as to contact the two sides of the container.

Such bars belong to a transfer or pusher-follower pusher unit SA which can stop at the zone where the elevator TE acts, and horizontally move backwards and forwards transversally to the chain conveyors.

Said unit SA comprises two horizontal arms 42 normal to said plate 35, spaced from one another in such a way as to permit the elevator TE to pass through, located at such a level as not to interfere, as will be explained below, with the movement of a rotary head TG, and carrying said bars 41. Each at one end of an arm 42.

At the other end, said arms 42 are rigid with a common bar 43 transversal to the chain conveyors and having a bore longitudinal of the bar which is engaged by a rod 44 arranged to support and guide the transfer means SA. Such rod 44 is transversal to the belt conveyors TCV and TMCV1 and above their right-hand end (see FIG. 1) and is supported at its two ends by two vertical uprights 45 connected to one another by a crosspiece 46.

The follower pusher SA is driven by a drive belt 47 extending parallel to the rod 44 and wound about two end horizontal pulleys 48 and 49.

The pulley 48 is in turn rotated by the motor 50 fixed to the upright 45.

When movement starts again, the means SA transfers the full container CP from the seat 34 over the fixed bridge 51 to the inside of the rotary head TG and stops at that limit position until through a 180° rotation of said head TG about its axis 52, as described in the above-mentioned Pat. 3,486,647, the container CP once disengaged from the rods 41 moves to the unloading position above the hopper T, while the empty container CV is being inserted into the gap between the rods 41.

After the foregoing description of the various members arranged to transfer the containers CP full of cigarettes from station to station throughout their path, the various members of the container feeding and storage apparatus according to the present invention arranged to transfer and distribute the empty containers CV, will be now taken into consideration.

The empty containers are removed, one at each cycle of the machine, by the head TG by means of said follower pusher SA and are transferred therefrom over said bridge 51 to above the seat 34' on the elevator TE which has meanwhile returned to its original position.

At this stage, each empty container is always under the action of the transfer means SA but has various alternate possibilities depending upon whether it has to reach the first (MC) or the two remaining manufacturing machines (MCI, MCII).

Let us consider first the condition occurring every three cycles of the machine where the container CV should normally be sent to the first manufacturing machine MC. In the case where such machine is stationary for any reason whatsoever, said container is transferred from the seat 34' to a seat 5 on the conveyor TMCV1 which acts as a store of the empty containers for the machine MC, and is located side by side with the elevator TE and is stationary.

Such conveyor TMCV1 disengages then the container from the transfer means SA and stores it while moving for a step from the right to the left (see FIG. 1).

If instead the machine MC is in a normal operating condition, the container CV is transferred from the seat 34' by means of the conveyor TMCV1 at rest, the fixed connecting bridge 53, and the stationary conveyor TCV to a position where it is completely superimposed, at the second limit position of the follower pusher SA, on a transfer or elevator means S1 stationary at uppermost position and arranged to vertically alternatingly moving.

Said means S1 which is driven by a device similar to that already described in connection with the elevator S2 has the function of transferring the empty container CV from the upper level to the level of the conveyor TMC of the machine MC.

At such level, while the elevator S1 and the elevator TMC adjacent thereto are stationary at the same time, a transfer or pusher means TR1 alternatingly moving transversally to the direction of movement of the chain conveyor laterally engages the container CV thereby causing it to slide to the station TMC'' of the conveyor TMC.

The driving device for the pusher TR1 is not visible in FIG. 1 and is similar to that described with reference to the pusher TR2.

The empty container CV is finally transferred by the conveyor TMC which moves forward intermittently, to the filling devices associated with the machine MC where it completes its travel.

Another case occurs twice every three cycles of the illustrated machine, that is $n - 1$ times for $n$ machines; in this other case, the empty container CV is to be supplied to the machine MCI or the machine MCII. It is then guided by the follower pusher SA through the conveyor TMCV1 and the bridge 53 to the conveyor TCV which is intermittently driven in the direction of the arrow and feeds the empty containers to further transfer means.

The first of said means or follower pusher SAI which is arranged to remove the empty containers CV to be sent to the machine MCI from the conveyor TCV which is stationary, is located above the upper level conveyor TCV and transversally extends between the right-hand end (see FIG. 1) of the conveyor TMCV2 and a transfer means or elevator S3.

Said means SAI moves backwards and forwards along a straight line and intervenes once every three cycles of the machine to remove a container CV at each two forward movements on TCV. Such means comprises two vertical bars 54 which forms gripping members, are spaced from one another so as to contact the two sides of the container CV, and are rigid with the common bar 55 transversal to the chain conveyors and having a longitudinal bore engaged by the rod 56.

As far as the guide, support and drive means for said follower pusher SAI, which are coupled to the motor 57, are concerned, reference should be made to the above description with reference to the transfer means SA.

For each container CV to be sent to the machine MCI and stationary at the operating line of the transfer means SAI, there are two possibilities. In the case where the machine MCI is stationary, such container is transferred from the conveyor TCV over the fixed connection bridge 58 to the conveyor TMCV2 which is arranged to store the empty containers for said machine and will receive the container concerned by moving forward a step from the right leftwards.

As an alternative, in the case of normal operation of the machine MCI, the empty container CV is directly transferred to said elevator which is standstill at the upper level, from where it is fed to the belt conveyor TMC1 by means of the transfer means or pusher TR3. The conveyor TMC1 conveys then the container to the filling means associated with said machine MCI.

What has been described with reference to the means S1 and TR1 also applies to the elevator S3 and the pusher TR3.

The containers CV to be supplied to the manufacturing machine MCII proceed towards a further transfer or follower pusher means SAII located above the terminal end of TCV and in alignment, transversally to the conveyors at the upper level, with both the left-hand end of TMCV3 on the one side and a transfer or elevator means S5 on the other.

Said means SAII, to which applies what was described with reference to SAI, intervenes once each three machine cycles to remove the last containers CV left on the belt TCV and is driven by the motor 59.

Such containers, similarly to what was described above, are then transferred, if the machine MCII stops, over the connection bridge 60 to the conveyor TMCV3 which is arranged to store the empty containers for said machine, or in the case of normal operation of the machine MCII they are transferred to the belt conveyor TMCII and the filling means associated with said machine by means of the elevator S5 and the pusher TR5, to which applies what was described with reference to the means S1 and TR1.

The feeding apparatus described with reference to FIGS. 1, 2, 3, 4, 5, as mentioned above, is arranged to operate in combination with a plurality of machines, as a coupling element between the cigarette manufacturing machines MC, MCI, MCII and the machine MI for obtaining packets of cigarettes.

For this reason, the apparatus according to the invention is subjected to numerous and variable operating conditions described below. Such machine, depending on its characteristics of fully automatic operation, each time adjusts itself, as will be explained, to the operating conditions of the various members forming it (see blocks in FIG. 4).

It should be noted that in the following description no reference is made to the transfer means TMC, S1, TR1, TR2, S2, SP1 of the machine MC, the transfer means TMCI, S3, TR3, TR4, S4, SP2 of the machine MCI and the transfer means TMCII, S5, TR5, TR6, S6, SP3 of the machine MCII, since their operation or non-operation only depend on the operation of the respective manufacturing machines. However, FIG. 5 also shows these transfer means.

1st CASE - All manufacturing machines MC, MCI, MCII are also running; the packaging machine MI is running.

In such conditions:

(a) the feeding conveyor TCP arranged to feed full containers moves with intermittent movement;

(b) The storage conveyor TMCP is stationary if TCP has all its seats engaged, or moves with intermittent forward movement in the feeding direction for each unengaged seat of TCP;

(c) Pusher S for filled or full containers moves with an alternate backward and forward movement with an intermediate dwell in the forward movement at the store conveyor TMCP and with a second dwell at the location of the elevator TE;

(d) vertical elevator TE for full containers moves with an alternating upward and downward movement with an initial and an intermediate dwell;

(e) Follower pusher SA for full containers CP and empty containers CV is running with a dwell in the forward movement at the vertical elevator TE and a dwell at the rotary head TG until the latter rotates, and with a dwell during the backward movement once each three machine cycles at the location of the transfer means S1 and twice each three cycles at the location of the feeding conveyor TCV;

(f) storage conveyor TMCV1 for empty containers for the machine MC is stationary;

(g) The feeding conveyor TCV for feeding empty containers to the machines MCi and MCII moves with an intermittent movement;

(h) Follower pusher SAI for the machine MCI is running once every three machine cycles by alternate backward and forward movements between the conveyor TCV and the transfer means S3 with a dwell at both said means;

(i) storage conveyor TMCV2 for empty containers for the machine MCI is stationary;

(l) Follower pusher SAII for the machine MCII is running by alternate backward and forward movements once every three machine cycles between the conveyor TCV and the transfer means S5 with a dwell at each of said means;

(m) Storage conveyor TMCV3 for empty containers for the machine MCII is stationary.

2nd CASE - All manufacturing machines MC, MCI, MCII are running; the packaging machine MI is stationary.

In such conditions:

(a) Feeding conveyor TCP for feeding full containers is running by an intermittent movement;

(b) Conveyor TMCP is running by an intermittent movement in the storing direction;

(c) Pusher S for full containers is running by alternate forward movements with dwell at the store conveyor TMCP and backward movements or by idle movements from TMCP to the location of the elevator conveyor TE and back movements;

(d) Vertical elevator TE is stationary;

(e) Follower pusher SA for full containers CP and empty containers CV is running by alternate backward and forward movements to and from the store conveyor TMCV1 for empty containers for the machine MC and the transfer means S1;

(f) Conveyor TMCV1 for empty containers for the machine MC is running once every three machine cycles in the feeding direction of the empty containers to the transfer means SA;

(g) Feeding conveyor TCV for empty containers to be fed to the machines MCI and MCII is running until it is fully exhausted, then is provided with an idle movement or is stationary;

(h) Follower pusher SAI for the machine MCI is running once every three machine cycles by alternate backward and forward movements to and from the store conveyor TMCV2 for empty containers for the machine MCI and the transfer means S3, with a dwell at both said means;

(i) Conveyor TMCV2 for empty containers for the machine MCI is running once every three machine cycles in the feeding direction of the empty containers to the transfer means SAI;

(l) Follower pusher SAII for the machine MCII is running once every three machine cycles by alternate backward and forward movements to and from the conveyor TMCV3 for empty containers for the machine MCII and the transfer means S5, with a dwell at both said means;

(m) Conveyor TMCV3 for empty containers for the machine MCII is running once every three machine cycles in the feeding direction of the empty containers to the transfer means SAII.

3rd CASE - The manufacturing machine MC is stationary; the manufacturing machines MCI and MCII are running and the packaging machine MI is running. In such conditions:

(a) Feeding conveyor TCP for full containers is running by intermittent movement;

(b) Storage conveyor TMCP is running in the feeding direction once every three machine cycles at the empty seats on TCP due to the dwells of MC;

(c) Pusher S for full containers is running by alternate backward and forward movements with a dwell in forward movement to withdraw a full container twice every three machine cycles at the location of TMCP and once every three cycles at the location of TMCP and with a further dwell at the location of the elevator conveyor TE;

(d) Elevator TE is running as in the first case;

(e) Follower pusher SA for full containers CP and empty containers CV is running with a dwell in the forward movement at the location of TE, a further dwell at the rotary head TG, and a dwell in the backward movement once each three cycles at TMCV1 and twice every three cycles at the location of TCV;

(f) Storage conveyor TMCV1 for empty containers for the machine MC is running in the storing direction by forward movement and with a dwell for each stored container;

(g) Feeding conveyor TCV for empty containers to be fed to the machines MCI and MCII is running as in the first case;

(h) Follower pusher SAI for the machine MCI is running as in the first case;

(i) Storage conveyor TMCV2 for empty containers for the machine MCI is stationary;

(l) Follower pusher SAII for the machine MCII is running as in the first case;

(m) Storage conveyor TMCV3 for empty containers for the machine MCII is stationary;

4th CASE - All manufacturing machines MC, MCI, MCII are stationary; the packaging machine MI is running. In such conditions:

(a) Feeding conveyor TCP for full containers is running and idly operates or is stationary after exhaustion;

(b) Conveyor TMCP is running by sporadic intermittent feeding movement for each absence of a container on TCP and at each cycle after the complete exhaustion of TCP;

(c) Pusher S for full containers is running by backward and forward movements and with a dwell at the location of TCP or at the location of TMCP in case of container absences on TCP and after complete exhaustion of TCP;

(d) Elevator TE is running as in the first case;

(e) Follower pusher SA is running with a dwell during the forward movement at the elevator TE, a further dwell at the rotary head TG and a dwell during the backward movement once each three cycles at TMCV1 and twice every three cycles at TCV;

(f) Store conveyor TMCV1 for empty containers for the machine MC is running in the storing direction with a forward movement and a dwell for each stored container;

(g) Feeding conveyor TCV for empty containers to be supplied to the machines MCI and MCII is running as in the first case;

(h) Follower pusher SAI for the machine MCI is running by a backward and forward movement once every three machine cycles for transferring empty containers from the conveyor TCV to TMCV2;

(i) Conveyor TMCV2 is running in the storing direction with a forward movement and a dwell for each stored container;

(l) Follower pusher SAII for the machine MCII is running by a backward and forward movement once every three machine cycles for transferring empty containers from conveyor TCV to TMCV3;

(m) Conveyor TMCV3 is running in the storing direction by a forward movement and a dwell for each stored container;

5th CASE - All manufacturing machines MC, MCI, MCII are also stationary and the packaging machine MI is stationary. In such conditions, all the feeding apparatus members are in a dwelling condition.

All the remaining possible operating conditions of the apparatus, depending on whether the four machines MC, MCI, MCII, MI are running or not, are directly deduced from what was described in the various preceding cases.

Thus, for instance in the general case where the machine MI is running and one or more of the manufacturing machines are stationary, the conveyor TMCP will supply full containers to each location where absence of containers exists on TCP, whereas the empty containers to be fed to the stationary manufacturing machines will be stored in the respective running stores with movement in the storing direction.

Finally, in the general case where the machine MI is stationary and one or more of the manufacturing machines are running, the latter are fed with empty containers, which have been transferred after the filling operation firstly to TCP and then stored on TMCP, by the respective stores.

As mentioned above with reference to FIGS. 6 and 7, the latter show by way of example diagrams of electrical circuits arranged to control the members of the apparatus and subjected to particularly complicated operating conditions. From said diagrams, the electrical circuits for the remaining members as well as the complete control circuit of the whole plant can be easily obtained, the complete control circuit being of the same type as that shown in FIG. 6 of the above-mentioned U.S. Pat. No. 3,679,079.

Figure 6:
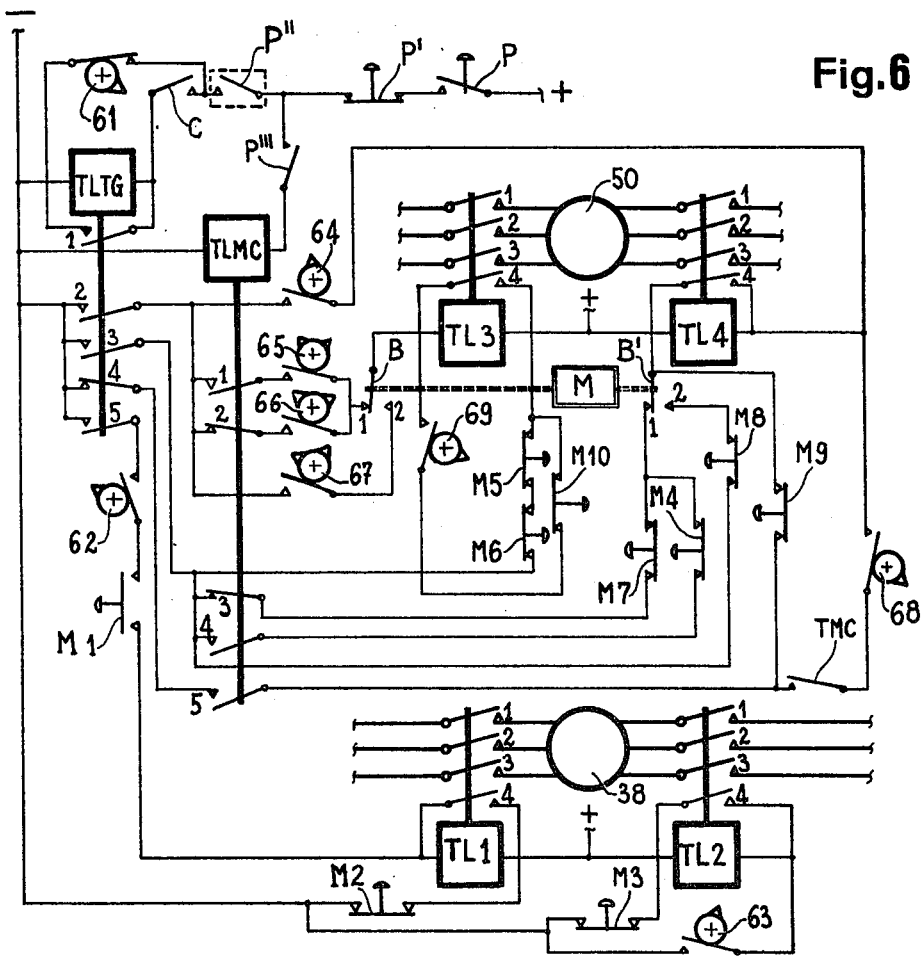
FIGS. 6 and 7 show examples of electrical control circuits for the apparatus according to the invention.
Figure 7:
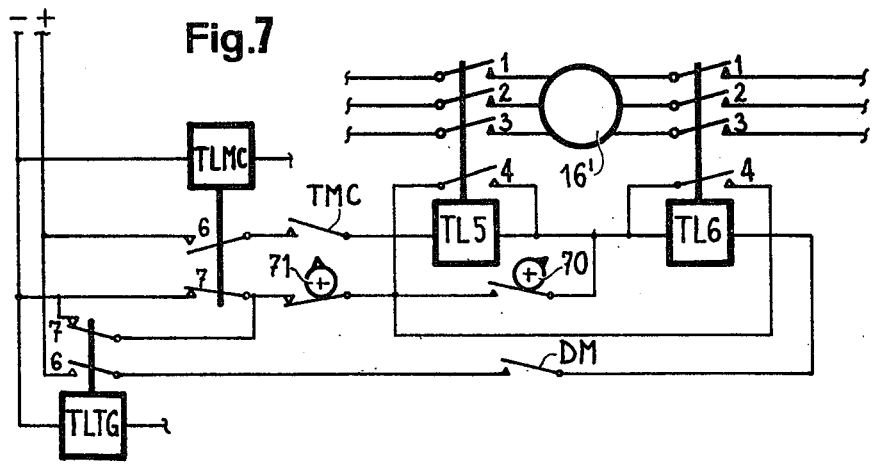

It should be noted that similarly to what has been disclosed in that patent, the various cams shown in the circuit diagrams of FIGS. 6 and 7 have to be imagined as keyed to the same shaft which at each machine cycle rotates through 360° independently of any possible operating condition of the plant.

In view of the above, one can choose for example a shaft driven by the driving shaft of the intermittently actuating means of the feeding conveyor TCP for full container.

The function of such cams is to synchronize during each machine cycle the functions of the various conveyor and transfer members forming the apparatus in accordance with the laws governing the movements of each of such members as described above and illustrated in the diagrams of FIG. 8.

The profiles of said cams are shaped so that the electrical contacts associated therewith are displaced during the desired movement once or several times at each cycle from their normal position, either an opening or a closing position, to the opposite position, and immediately return to their original position.

FIG. 6 shows the electrical control circuit of the transfer or elevator means TE for full containers CP and of the transfer means or follower pusher SA for full containers CP and empty containers CV.

As mentioned above, such means are respectively driven by the motor 38 and the motor 50 both arranged to rotate in the two directions of rotation, the motor 38 having two remote control switches TL1 and TL2 and the motor 50 having two remote control switches TL3 and TL4.

P indicates a contact controlled by a general pushbutton for starting the whole plant, whereas P' indicates a contact controlled by a general stop or cut-off pushbutton. P" indicates a contact which is closed in the normal operating conditions of the packaging machine MI and is open when such machine is stationary for any reason.

C indicates a contact which is closed when the cigarettes inside the hopper T have lowered below a predetermined level, as described in the above mentioned Patent 3,486,647.

It should be noted that such closing operation of the contact C coincides with the beginning of the rotational movement of the rotary head TG and is taken as the initial moment of 1° or 0° position in, the machine cycle in the diagrams of FIG. 8.

P''' indicates a contact which is closed in normal operating conditions of the manufacturing machine MC and is open when such machine is stationary for any reason.

A remote 5-contact control switch is indicated by TLTG and has its actuator connected to the supply line through contacts P, P′, P″, C. TLMC indicates a remote 5-contact control switch which is similarly connected to the supply line through contacts P, P′, P′″.

Cams 61, 62, 63, 64, 65, 66, 67, 68, 69 of the above-mentioned type cyclically intervene in the operation of the circuit of FIG. 6 by means of the contacts associated with each of them.

As far as the above-mentioned memory M is concerned, it controls, by actuating the moving contacts B and B′, the distribution of empty containers to the machine MC or the machines MCI, MCII.

The function of the various microswitches shown in the circuit of FIG. 6 will be described below.

Let us assume now that the machine MI is running in normal operating conditions and the contact P is closed. Accordingly, upon closing of the contact C, that is in the moment where the cycle begins, the remote control switch TLTG is energized which results in the closing of its contacts 1, 2, 3, 5 and opening of its contact 4.

Upon reopening of the contact C, after the rotary head TG has rotated and a new batch of cigarettes has been unloaded into the hopper T, the remote control switch TLTG remains self-energized through its contact 1 and the contact, which is also normally in closing conditions, and associated with the end-cycle camm 61.

Assume now that a full container CP full of cigarettes from the conveyor TCP or the store conveyor TMCP is located in the lower seat 34 of the elevator TE. The microswitch M1 upon detecting the presence of the container CP in such position closes the contact associated therewith so that upon closing of the contact in series with the previous one associated with the cyclic cam 62, the remote control TL1 is energized thereby closing its contacts 1, 2, 3 arranged to start the motor 38 of elevator TE and the contact 4 through which the self-excited circuit of TL1 is closed again.

The container CP after reaching the upper level actuates the microswitch M2 thereby opening said self-excited circuit and stopping the motor 38.

After a dwell at the elevator TE in its limit position and while waiting for the removal of the full container of the follower pusher SA, the cyclic cam 63 closes the contact associated therewith thereby self-exciting the remote control switch TL2 which result in the closing of its contacts 1, 2, 3 to cause the elevator motor 38 to rotate in a direction opposite to the preceding one and its contact 4 to close its self-excited circuit.

As soon as it has regained its initial position, that is once it has completed its operating cycle, the elevator TE opens said self-exciting circuit through the actuation of the microswitch M3 and thus stops the motor 38.

For better understanding the electrical control circuit and the various operating stages of the follower pusher SA, let us consider the moment where, always as described in the U.S. Pat. No. 3,586,647, an empty container CV, after the rotation through 180° of the rotary head TG, is already inserted into the space between the rods 41 in the position previously occupied by the full container CP.

As already mentioned above, various possibilities exist at that point for the empty container.

In the case occurring every three machine cycles where the container is to be fed to the manufacturing machine MC, the moving contacts controlled by the memory M move to the position B-1 and B′-1.

Since, as initially assumed, the contact 2 of the remote control switch TLTG is in a closing condition, as soon as the cam 64 closes the contact associated therewith the remote control switch TL4 becomes energized.

This results in the immediate closing of its contacts 1, 2, 3 for starting the motor 50 and of its contact 4 for the self-excited circuit.

The direction of rotation of the motor 50 is such as to cause the follower pusher SA to be transferred from the rotary head TG towards the chain conveyors and precisely to the location of the elevator S1 in the case taken into consideration above of normal operation of the machine MC or, alternatively, to the store conveyor TMCV1, if MC is stationary.

In the first case, the remote control switch TLCM while being energized has its contacts 1, 4, 5 closed, its contacts 2 and 3 open and the self-exciting circuit of the switch TL4 is connected to the current supply line through the contact B′ in the position B′-1 and the microswitch M4 is in a closing condition, the contact 4 of TLMC and the contact 3 of TLTG.

As soon as the container CV has reached the elevator S1, the limit microswitch M4 opens the self-excited circuit of TL4 and thus stops the motor 50 and closes at the same time a second contact for starting the cycle of the memory MC.

After a dwell until the container CV has been lowered, the follower pusher means SA begins its return stroke. The cam 65 by means of the first of two extensions projecting from its periphery closes the contact associated therewith so as to connect the self-excited circuit of the remote control switch TL3 to the current supply. Such circuit besides said contact also comprises the contact B in the position B-1, the contact 1 of TLMC and the contact 2 of TLTG.

The closing of the contacts 1, 2, 3 of the remote control switch TL3 results in the immediate energization of the motor 50 which is rotated in the direction opposite to the preceding one, whereas upon closing of its contact 4 current is supplied to the motor 50 even after the reopening of the contact associated with the cams 65, through the circuit comprising the microswitches M5 and M6 in the closing condition and the contact 3 closed by the remote control switch TLTG.

The motor 50 stops upon opening of said microswitch M5 as soon as the follower pusher SA has attained the ascending zone of the elevator TE, during its return stroke.

After a dwell to wait a new full container CP to be inserted between the rods 41, the cam 65 closes again by means of the second of its extensions the contact associated therewith thereby causing the motor 50 to rotate again through the already mentioned self-excited and control circuits.

The follower pusher SA starts then to move again and transfers at the end of its cycle the container CP to the inside of the rotary head TG at which the microswitch M6 series connected to M5 stops again the motor 50 thereby blocking the self-excited circuit of the remote control circuit TL3 (see diagram 1 of SA of FIG. 8).

In the previously mentioned case where the machine MC is stationary, the contact PII1 is open, the remote control switch TLMC in its de-energized condition has its contacts 1, 4, 5 open and its contacts 2 and 3 closed, and the empty containers CV from the rotary head TG complete their displacement on the conveyor TMCV1.

The motor 50, as mentioned above, is rotated also in this case by the cam 64 which closes the contact associated therewith and energizes the remote control switch TL4 the self-excited circuit of which is connected in such conditions to the current supply through the circuit portion comprising the microswitch M7, the contact 3 of TLMC and the contact 3 of TLTG.

It is the microswitch M7 which stops the motor 50 as soon as the container CV has attained one of the seats 5 on the conveyor TMCV1.

After a dwell required for the storing operation of said conveyor TMCV1, the follower pusher SA is free to start its return stroke which, similarly to what was described above, takes place in two stages with the usual intermediate dwell at the location of the elevator TE to wait for the full container CP.

The motor 50 is rotated during both said stages owing to the action of the cam 66 which closes twice each cycle by means of the two extensions projecting from its periphery, the contact associated therewith so as to connect the control circuit of the remote control switch TL3 to the current supply.

Such circuit comprises besides such contact and the contact B always in the position B-1, also the contact 2 of TLMC and the contact 2 of TLTG, whereas the self-exciting circuit of said remote control switch is the same as in the previous case.

The stops of the follower pusher SA, firstly above the elevator TE and then at the end of the cycle within the rotary head TG are also caused by the microswitches M5 and M6, respectively (see diagram II of SA of FIG. 8).

Let us consider now the case occurring twice every three cycles, where the empty container CV is to be sent to the conveyor TCV, i.e. to the machine MCI or the machine MCII, always in the normal operating conditions of the machine MI.

In such conditions, the moving contacts controlled by the memory M are arranged in the positions B-2 and B'-2. The cam 64 closes the contact associated therewith thereby causing, as in the preceding cases, the remote control switch TL4 to became energized and thus the motor 50 starts rotating.

Said remote control switch remains then self-excited through the circuit comprising its contact 4, the contact B' in the position B'-2, the microswitch M8 located at the conveyor TCV and finally the contact 3 of TLTG.

The microswitch M8 has the function of stopping the motor 50 as soon as the empty container CV occupies, at the end of its displacement, one of the seats 5 of the conveyor TCV which by moving forward by a step in the direction of the arrow disengages said container from the rods 41.

After the dwell required for allowing such operation to take place, the follow pusher SA is free to start its return stroke which still occurs in two stages with an intermediate dwell at the elevator TE for removing the container CP.

The motor 50 is started in both such stages by the cam 67 which closes twice each cycle by means of the two extensions projecting therefrom the contact associated therewith so as to connect the control circuit of the remote control switch TL3 to the current supply.

This control circuit comprises besides said contact, the contact B in the position B-2 and the contact 2 of TLTG, whereas the self-exciting circuit of said remote control switch is the same as that described in the preceding cases.

The stops of the follow pusher SA, firstly above the elevator TE and then at the end of the cycle within the rotary head TG, are caused by the microswitches M5 and M6, respectively (see diagram III of SA of FIG. 8).

Finally, let us consider the case where the packaging machine MI and thus also the rotary head TG are stationary and are then unable to receive full containers CP nor to deliver empty containers CV, and the manufacturing machine MC is in normal operation conditions. In such a case, the remote control device TLTG is in a de-energized condition and thus has its contacts 1, 2, 3, 5 open and its contact 4 closed.

In such a case, as known, the follower pusher SA removes empty containers from the store conveyor TMCV1 and supplies them to the elevator S1.

The energization of the remote control switch TL4 required for causing the motor 50 to rotate in the desired direction for such transfer operation occurs upon closing of the contact associated with the cam 68 through the circuit comprising the contact 4 of the remote control switch TLTG, the contact 5 of the remote control switch TLMC and the contact TMC which is closed each time the machine MC is ready to receive a container CV (in view of the above this happens once every three machine cycles).

The current supply is connected to the remote control switch TL4 after the opening of the contact associated with the cam 68 through a self-excited circuit comprising in series besides its contact 4, the microswitch M9 located at the elevator S1, the contact 5 of TLMC and the contat 4 of TLTG.

Said microswitch M9 has the function of stopping the motor 50 as soon as the empty container CV has reached the elevator S1 at the end of its displacement.

The return stroke of the follow pusher SA, after a dwell for allowing the container CV to be disengaged from the rods 41, is obtained by supplying current to the motor 50 through the remote control switch TL3 the control circuit of which comprises the contact 4 of the remote control switch TLTG, the contact 5 of the remote control switch TLMC and is closed by the cam 69 through the contact associated therewith.

The remote control switch TL3 remains self-excited after this contact has been reopened, through a self-exciting circuit comprising in series besides its contact 4, the microswitch M10 located at the conveyor TMCV1, the contact 5 of TLMC and the contact 4 of TLTG.

The microswitch M10 has the function of stopping the motor 50 as soon as SA reaches the conveyor TMCV1 at the end of its displacement (see diagram IV of SA of FIG. 8).

FIG. 7 shows the electrical circuit diagram arranged to control the store conveyor TMCV1 for empty containers CV for the manufacturing machine MC. A similar circuit is also provided for the store conveyor TMCV3 for empty containers for the machine MCII.

The circuit comprises a motor 16' (not shown in the drawings), two remote control switches TL5 and TL6 each having four contacts and being arranged to control said motor, two contacts 6 and 7 of the already mentioned remote control switch TLTG, the former contact being open and the latter being closed in the de-energized conditions of said remote control switch, and finally the contacts 6 and 7 of the already mentioned remote control switch TLMC, the contact 6 being open and the contact 7 being closed in the de-energized condition of the switch TLMC.

Two cams 70 and 71 which operate on the contacts associated therewith have the function of starting and stopping the motor 16'.

Said circuit comprises the contact TMC which, as mentioned above, is closed once every three cycles when the machine MC is ready to receive a container, and contact DM which is closed once every three machine cycles upon control of the memory M.

From the circuit of FIG. 7 and as described above, it appears that the motor 16' which drives the conveyor TMCV1 is in a dwelling condition both in the case where the packaging machine MI and the manufacturing machine MC are simultaneously stationary and in the case where the empty containers CV are directly transferred from the rotary head TG to the elevator S1, while both machines are in a normal operating condition.

The energizing and de-energizing of the remote control switch TLTG, simultaneously with TLMC results in the de-energization of the two remote control switches TL5 and TL6 connected to the motor 16'.

Assume now that the packaging machine MI is in normal operating conditions while the manufacturing machine MC is stationary.

In such conditions, the remote control switch TLTG is energized and has contact 6 closed and its contact 7 opened, whereas the remote control switch TLMC has, as shown in FIG. 7, the contact 6 opened and the contact 7 closed.

Accordingly, when the cam 70 closes the contact associated therewith and upon closing of the contact DM series-connected to the preceding one, the remote control switch TL6 is energized which results in closing of its contacts 1, 2, 3 arranged to cause the motor 16' to rotate in the storing direction of the containers, and in closing of the contact 4.

After the re-opening of the contact associated with the cam 70, the self-excited circuit comprising said contact 4 of TL6, the closed contact associated with the cam 71 and the contact 7 of the remote control switch TLMC, feeds current to the motor 16'.

After the conveyor TMCV1 has moved forward by a step, the motor 16' is blocked by stop cam 71 which opens the contact associated therewith.

Finally, let us consider the case where the packaging machine MI is stationary, while the manufacturing machine MC is in normal operating conditions.

In such conditions, unlike the last-mentioned case, the remote control switch TLTG is de-energized and has the contact 6 open and the contact 7 closed, while the remote control switch TLMC is energized and has its contact 6 closed and the contact 7 opened.

Accordingly, upon simultaneous closing of the contact associated with the cam 70 and the contact TMC, the remote control switch TL5 is energized which results in the closing of its contacts 1, 2, 3 arranged to cause the motor 16' to rotate in the feeding direction of the containers, and the closing of its contact 4.

Current is supplied to the motor 16' after the re-opening of the contact associated with the cam 70, through the self-excited circuit comprising said contact 4 of TL5, the closed contact associated with the cam 71 and the contact 7 of the remote control switch TLTG.

After the conveyor TMCV1 has moved forward one step so as to deliver an empty container to the follow pusher SA (see the respective diagram of FIG. 8), the motor 16' is blocked by the intervention of the cam 71 which opens the contact associated therewith.

I claim:

1. A system for manufacturing and packeting cigarettes and for feeding containers for them between manufacturing and packeting areas and for compensating operating unbalances of cigarette manufacturing and packeting operations, comprising:

a group of $n$ cigarette manufacturing machines, each having means for filling empty cigarette containers with newly manufactured cigarettes;

a cigarette packeting machine for packeting cigarettes received in the full cigarette containers from the several manufacturing machines at an output speed $v$ substantially equal to a sum of operating speeds of the manufacturing machines, each operating speed being substantially equal to $v/n$ and the packeting machine having, for feeding it with the cigarettes, a grouping hopper having a loading mechanism for loading it by emptying full cigarette containers into the hopper and by discharging empty cigarette containers;

a feeding conveyor system having a full-container feeding conveyor intermittently movable in successive steps past the manufacturing machines in a direction toward the loading mechanism for feeding the full cigarette containers to said mechanism, the feeding conveyor system also having an empty-container feeding conveyor parallel and adjacent to the full-container feeding conveyor and similarly movable synchronously with the same in a direction from said mechanism past the manufacturing machines for feeding the empty cigarette containers to the latter machines;

a feeding transfer system having primary container transferring device groups, one for each manufacturing machine, disposed adjacent the same and similarly synchronously movable transversely of the feeding conveyors to transfer full cigarette containers directly upon the filling thereof by the manufacturing machines onto the full-container feeding conveyor during halting intervals thereof, and similarly to transfer empty cigarette containers from the empty-container feeding conveyor to the manufacturing machines for filling with newly manufactured cigarettes, and a secondary container transferring device group disposed adjacent the loading mechanism of the grouping hopper and similarly synchronously movable for correspondingly similarly transferring full and empty cigarette containers between that mechanism and the feeding conveyor system;

a storage conveyor system having elongate full-container storage conveyor means and similar empty-container storage conveyor means both parallel and adjacent the feeding conveyors and intermittently, synchronously with the feeding conveyors, movable in movements along the same, each storage conveyor means in either direction of the feeding conveyors; and a conveyor transfer system having container transferring apparatus disposed adjacent the several conveyors and similarly synchronously movable for transferring full and empty cigarette containers between the respective feeding and storage conveyors during halting intervals thereof, and memory means controllable by presence and absence of cigarette containers on successive portions of the several conveyors for controlling the storage conveyor system and the conveyor transfer system to automatically effect the movements of the storage conveyor means in the direction of one of the feeding conveyors, and the transferring of the containers between the conveyors so as to compensate for operating unbalances of the several machines.

2. A system according to claim 1 wherein each primary container transferring device group comprises a full-container transferring device for the transferring of the full cigarette containers, and an empty-container transferring device for the transferring of the empty cigarette containers, said devices being connected to the memory means of the conveyor transfer system to effect the respective transferring once every $n$ of the successive steps of the feeding conveyors, each device in succession to the other.

3. A system according to claim 1 wherein each primary container transferring device group comprises a full-container transferring device for the transferring of the full cigarette containers, and an empty-container transferring device for the transferring of the empty cigarette containers, said devices being connected to the memory means of the conveyor transfer system to effect the respective transferring once every $n$ of the successive steps of the feeding conveyors, each device simultaneously with the other.

4. A system according to claim 1 in which the full and empty container storage conveyor means include a group of $n$ empty container storage conveyors for each of said means, one for each cigarette manufacturing machine.

5. A system according to claim 4 in which the conveyor transfer system includes control means connected to the memory means to effect the transferring of empty containers to the $n$ manufacturing machines uniformly during every $n$ of the successive steps.

6. A system according to claim 5 in which the control means is connected to the memory means to effect the transferring of empty containers between the conveyors once every $n-1$ times during every $n$ of the successive steps.

7. A system according to claim 1 in which the feeding and storage conveyors are disposed on two levels above one another, and the container transferring device groups include container elevator devices for upwardly and downwardly effecting their respective transferring of containers.

8. A system according to claim 7 in which the empty-container feeding and storage conveyors are disposed on the level above the full-container feeding and storage conveyors.

9. A system for feeding cigarettes in containers for them between cigarette manufacturing and packeting areas and for compensating operating unbalances of cigarette manufacturing and packeting operations, comprising;

a feeding conveyor system having a full-container feeding conveyor intermittently movable in successive steps past cigarette manufacturing machines in a direction toward a loading mechanism for feeding full cigarette containers to a mechanism of a grouping hopper of a cigarette packeting machine, the feeding conveyor system also having an empty-container feeding conveyor parallel and adjacent to the full-container feeding conveyor and similarly movable synchronously with the same in a direction from said mechanism past the manufacturing machines for feeding the empty cigarette containers to the latter machines;

a feeding transfer system having primary container transferring device groups, one for each manufacturing machine, similarly synchronously movable transversely of the feeding conveyors to transfer full cigarette containers directly upon the filling thereof by the manufacturing machines onto the full-container feeding conveyor during halting intervals thereof, and similarly to transfer empty cigarette containers from the empty-container feeding conveyor to the manufacturing machines for filling with newly manufactured cigarettes, and a secondary container transferring device group similarly synchronously movable for correspondingly similarly transferring full and empty cigarette containers between the loading mechanism and the feeding conveyor system;

a storage conveyor system having elongate full-container storage conveyor means and similar empty-container storage conveyor means both parallel and adjacent the feeding conveyors and intermittently, synchronously with the feeding conveyors, movable in movements along the same, each storage conveyor means in the direction of either feeding conveyor; and a conveyor transfer system having container transferring apparatus disposed adjacent the several conveyors and similarly synchronously movable for transferring full and empty cigarette containers between the respective feeding and storage conveyors during halting intervals thereof, and memory means controllable by presence and absence of cigarette containers on successive portions of the several conveyors for controlling the storage conveyor system and the conveyor transfer system to automatically effect the movements of the storage conveyor means in the direction of either feeding conveyor, and the transferring of the containers between the conveyors so as to compensate for operating unbalances of the packeting and manufacturing machines.

* * * * *